April 6, 1965 E. G. SCHEIBEL 3,177,196
LIQUID-LIQUID EXTRACTION PROCEDURE
Filed Nov. 25, 1960 5 Sheets-Sheet 1

INVENTOR
Edward George Scheibel

BY Fidelman & Lavine
ATTORNEY

April 6, 1965   E. G. SCHEIBEL   3,177,196
LIQUID-LIQUID EXTRACTION PROCEDURE
Filed Nov. 25, 1960   5 Sheets-Sheet 2

INVENTOR
Edward George Scheibel

BY *Fidelman & Lavine*
ATTORNEY

INVENTOR
Edward George Scheibel

April 6, 1965        E. G. SCHEIBEL        3,177,196
LIQUID-LIQUID EXTRACTION PROCEDURE
Filed Nov. 25, 1960        5 Sheets-Sheet 5

INVENTOR
Edward George Scheibel

BY *Fidelman & Lavine*
ATTORNEY

United States Patent Office 3,177,196
Patented Apr. 6, 1965

3,177,196
LIQUID-LIQUID EXTRACTION PROCEDURE
Edward G. Scheibel, Montclair, N.J., assignor to York Process Equipment Corporation, West Orange, N.J., a corporation of New Jersey
Filed Nov. 25, 1960, Ser. No. 71,601
16 Claims. (Cl. 260—97.6)

This application is a continuation-in-part of applicant's prior application S.N. 720,785, now U.S. Patent No. 3,119,767, and S.N. 732,922, now abandoned, and it relates to applicant's prior application S.N. 720,682, now abandoned.

The instant invention relates to a process for separating a liquid mixture into at least two component fractions by means of a liquid-liquid extraction procedure wherein the incoming mixture is extracted by a pair of mutually immiscible solvents containing refluxed product, the solvent extracts then being treated to separate the extract products from the solvents, and to recycle the solvents to the extraction step.

The principal object of the instant invention is to provide a new and improved dual solvent procedure for effecting extractive separations.

Further objects and other advantages of the instant invention will be apparent from the description which follows.

Many workers in the art have considered the possibility of separating a liquid mixture by extraction against a pair of mutually immiscible counter-currently flowing solvents. Since each of the solvent extract phases invariably constitutes a mixture, this time of solvent and product, some sort of recovery procedure is required in order to attain the separated products free of solvent and recycle solvent free of extracted component. Unfortunately the common recovery expedient of distilling the extract phases is notoriously wasteful of heat, and worse, may be undesirable for recovery of heat-sensitive products or heat sensitive solvents. Often the problems arising from efforts to employ distillation techniques on the solvent extract phases are so serious that extraction separation is unfeasible.

It has now been discovered that if the solvent extract phases from a dual solvent extraction were treated by appropriate re-extraction steps, employing the same solvents in different proportions, and further if the re-extraction or secondary extraction steps were properly interrelated with the operation of the principal dual solvent extraction, an extraction separation procedure can be provided that:

(1) Substantially reduces the overall heat requirements of the separation.

(2) Recovers separated product without subjecting same to excessive distillation temperatures.

(3) Effects separation with a product quality not heretofore believed feasible.

Thus, the first step of the instant process provides for extraction separation of a two component mixture between an immiscible pair of solvents of different specific gravities. In this primary extraction, the solvent ratio is such that the extraction factor for one component will be greater than unity and the extraction factor for the other component will be less than unity. The term extraction factor is commonly employed to designate the ratio of the amount of a component dissolved in one immiscible solvent to the amount dissolved in the other immiscible solvent. (The definition is set forth in column 2 of applicant's prior Patent No. 2,676,903; a corresponding mathematical definition can be found on page 741 of Chemical Engineer's Handbook, edited by Perry, 3rd edition, McGraw-Hill (1950).)

The subsequent extraction and recovery steps are wherein the improvement of the instant invention primarily resides. In one instance at least part of the enriched light solvent from the primary extractor is contacted with fresh heavy solvent in a secondary extractor under circumstances where the extraction factor for the component in the fresh heavy solvent will be greater than unity, thereby effectively re-extracting the material from the light solvent and allowing the so treated light solvent to be employed elsewhere as fresh light solvent. Similarly at least part of the enriched heavy solvent from the primary extractor is contacted with fresh light solvent in another secondary extractor under circumstancecs where the extraction factor for the component in the light solvent will now be greater than unity, thereby effectively re-extracting the material from the heavy solvent and allowing the so treated heavy solvent to be re-employed elsewhere as fresh heavy solvent. As desired, extract product can be recovered variously from enriched solvent leaving the primary extractor or from enriched solvent leaving the secondary extractors.

As initially indicated, an important part of the instant invention is the interrelation of the several extraction steps and product recovery steps to provide adequate solvent ratios for effecting the desired separations in the primary extractor and in the secondary or reflux extractors.

The actual degree to which a mixed feed (A+B) can be partitioned between two solvents (X, Y) in a liquid-liquid extraction step is determined by many factors such as the difference of the distribution coefficient of the feed components, the number of plates in the extraction column, the relative volumes, of feed and solvents, etc. It is well known in the art that extraction effects separation through the difference in the distribution coefficients of the components in the mixture. It is thus possible to select such a ratio of solvent quantities that when the phases are brought to equilibrium with each other, more than half of one component will be dissolved in one phase, which condition corresponds to an extraction factor greater than unity, and more than half of the other component will be dissolved in the other phase, which condition corresponds to an extraction factor less than unity when the extraction factors are defined in the same units in both cases. By carrying out a counter-current operation with a sufficient number of such equilibrium contacts, it is possible to produce two solvent phases, each containing only one of the components in the feed such as an XA solvent extract phase and a YB solvent extract phase. Ordinarily the extract phase XA is not completely free of component B, nor is extract phase YB completely free of component A.

According to the instant invention the degree of separation attained in the dual solvent extraction step is improved by returning some separated product (A or B) back to the extraction zone as reflux. The concept of refluxing product and the advantages attainable with reflux are essentially the same as the well known use of reflux in the distillation arts. However in sharp distinction to the distillation arts, the reflux need not be separated out product. Here what is done is to make the entering X solvent a mixture of X and component B, and, or, alternatively, the entering Y solvent is a mixture of Y and component A. Through this use of reflux the purity of extract products XA and YB is improved because the reflux component B fed in as part of solvent X passes counter-current to the impurity component A carried along with extract phase YB. Indeed, at the limiting instance of total reflux, the number of theoretical stages may be reduced to virtually half the number required for the same degree of separation without reflux. For a more detailed explanation of reflux in fractional liquid extraction and the benefits obtainable by the use of reflux, reference is made to applicant's published article "Optimum Reflux Ratio for Fractional Liquid Extraction," Ind. and Eng. Chem., vol. 47, No. 11 (1955), pages 2290–2293. The production of reflux solvent stream XB or YA from what can be termed secondary extraction steps is an important aspect of this invention.

Conditions in the secondary extraction steps are the reverse of conditions in the original or principal dual solvent extraction step. Thus, the extraction factor is greater than unity for solvent X and component A in the principal extraction, while the secondary extraction is operated with different relative quantities of the same solvents (X and Y) so that the extraction factor is reversed i.e. is less than unity for the extracted component in the extract phase being re-extracted. Thus under these conditions the component A is stripped (i.e. re-extracted) by solvent from the extract phase XA. As a result a relatively pure stream of solvent X and a secondary solvent extract stream YA (which can be employed as the reflux stream) are the product streams from the secondary extraction. A reflux stream XB can similarly be obtained by a secondary extraction treatment of solvent extract phase YB with enough of solvent X to make the extraction factor less than unity for product B in solvent Y.

Aside from the provision of reflux to the principal extraction step, employment of secondary extraction on at least one solvent extract phase imparts a high degree of flexibility to the extraction procedure as a whole. One instance of such advantageous flexibility lies in the possibility of recovering component A from either the extract phase XA or the reflux phase YA. Similarly, component B can be recovered from either the extract phase YB or the reflux phase XB. Thus if one of the solvents (say Y) is difficult to distill for one reason or another e.g. heat sensitivity and the other solvent (X) is readily distilled, then the extract stream XA of the principal extraction can be distilled to recover product A, and a portion of the XB stream from the secondary extractor can be distilled to recover product B while the balance is run to the primary extractor. This specific embodiment eliminates any need for subjecting solvent Y to distillation.

For a further understanding of the instant invention reference is made to the attached drawings wherein is illustrated in FIGURES 1 to 5 several preferred modes for carrying out extraction procedures according to the principles of the instant invention.

In each of the illustrated modes there is in common (a) a principal extraction step in a multistage counter-current extractor where the liquid to be separated into the desired component products is subjected to the counter-current action of two immiscible solvents of different specific gravity, i.e. light solvent and heavy solvent, and (b) at least one secondary extraction step also in a multi-stage counter-current extractor, where an extract phase is stripped of the extracted component to supply reflux to the principal extraction step.

Figure 1:
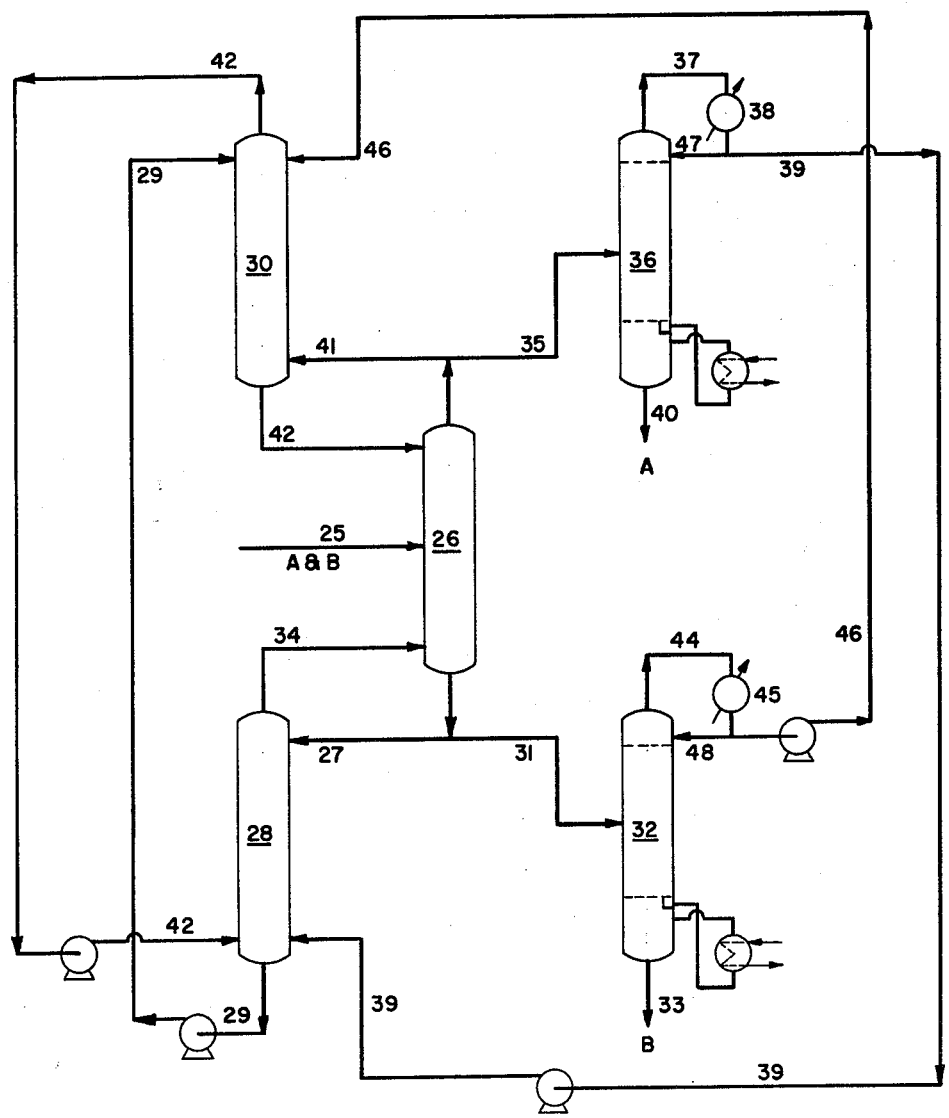
FIGS. 1, 2 illustrate comprehensive sequences wherein the heavy solvent extract phase is counter-currently contacted in a secondary extraction step with a relatively fresh stream of light solvent and the light solvent extract phase is contacted in still another secondary extraction step with a relatively fresh stream of heavy solvent.

As a whole the various preferred embodiments illustrated in the drawings demonstrate the versatility which is imparted to dual solvent extraction systems by employment of the re-extraction and reflux concepts of the instant invention.

Referring now to FIG. 1 there is illustrated here an embodiment wherein the principal object of the re-extraction technique is to attain a reflux return of separated component parts of the feed mixture to the principal extractor. This is done by treating the extract phases from the principal extractor as follows. In the secondary extractor one portion of the heavy solvent extract phase is extracted with the entire quantity of fresh light solvent in the system. The other portion of the heavy solvent extract phase is sent directly to a distillation recovery column. Similarly one portion of the light solvent extract phase is extracted in another secondary extractor with the entire quantity of fresh heavy solvent in the system. The other portion of the light solvent extract phase is sent to a recovery distillation. The exact amounts of the heavy and light solvent extract phases respectively passed to the two secondary extractors depends on the solvent properties. Generally speaking, however, only so much of the extract phase is sent to the secondary extractor as can be stripped of the separated product with the available fresh solvent. The ratios of the two solvents in the principal and secondary extraction columns are chosen so that in the principal extraction the extraction factor for one component will be greater than unity and the extraction factor for the other component will be less than unity, but will be reversed in the secondary extraction so that the extraction factor for the first component in the original solvent extract phase becomes less than unity. This reversal of the extraction factor is what permits the product component to be re-extracted so to speak for reflux purposes.

The process illustrated in FIGURE 1 is most applicable when both solvents are readily distillable and require heat inputs of the same order of magnitude in the recovery distillation columns.

In the particular flow sheet shown as FIGURE 1 it has been assumed for purposes of interconnecting the several extraction and distillation columns that the feed mixture is less volatile than the solvents. If it were more volatile it would be taken overhead in the solvent recovery columns and the bottom products would then be recycled to the appropriate secondary or stripping extractors.

The feed mixture consisting of products A and B is fed by line 25 into fractional liquid primary extractor 26 which is a multistage counter-current extraction column and there subjected to the counter-current action of two immiscible solvents of different specific gravities, hereinafter termed light solvent and heavy solvent.

The heavy solvent leaves the bottom of the extractor 26 with the component which is more soluble in it, herein termed product B. A portion is diverted through line 27 to the top of heavy solvent stripping extractor 28 while the rest goes through line 31 to heavy solvent recovery distillation column 32 from which product B is withdrawn through line 33. The division of the heavy solvent extract phase into lines 27 and 31 is determined as hereinbefore described.

From secondary extractor 28 the now stripped heavy solvent passes through line 29 to the top of light solvent stripping secondary extractor 30, thence down through the extractor and line 42 to the top of primary extractor 26.

Meanwhile from heavy solvent recovery distillation column 32, heavy solvent is circulated through line 44, condenser 45 and then part through line 48 back to the top of distillation column 32 for reflux, while the balance is sent to the top of light solvent stripping extractor 30 through line 46.

The light solvent leaves the top of primary extractor 26 with product A. One portion goes by way of line 41 to the bottom of light solvent stripping extractor 30, while the remaining portion passes through line 35 to light solvent recovery distillation column 36, from which product A is withdrawn through line 40. The division of the light solvent extract phase into lines 41 and 35 is determined according to the properties of the two solvents, the mixture being separated and the desired product purity.

From the top of secondary extractor 30 the stripped light solvent passes through line 42 to the bottom of heavy solvent stripping extractor 28, thence up through the extractor and line 34 to the bottom of extractor 26.

Meanwhile from light solvent recovery distillation column 36 the light solvent is circulated through line 37, condenser 38, part returning by way of line 47 back to the top of column 36, for reflux, while the balance is sent by line 39 to the bottom of heavy solvent stripping extractor 28.

The advantages of this process are obvious from this flow sheet. The usual procedure in this type of operation is to send all the effluent stream to the distillation recovery columns. By the instant process only a minor fraction of the solvent streams are sent to the recovery step. Process calculations indicate that the advantages gained are greater with the more difficult separations which require a large number of equilibrium contacts and large quantities of solvent relative to the amount of feed mixture introduced into the primary extractor 26. Thus, fractional liquid extraction process requiring about 20 parts of each solvent per part of feed to the primary fractional extractor can be carried out by this process by recovering only 5–10% of the solvent by distillation. The balance of the solvent is recycled without distillation. Hence, this process can make practical and economic separations which heretofore would be completely uneconomic.

The principles described above and illustrated in FIGURE 1 can also be employed in a system which divides the reflux stream so that a portion thereof returns to the principal extraction zone and the balance is sent to product recovery. In this mode, all of the solvent extract phase, of both light solvent and heavy solvent is stripped in secondary extractors by counter-current contact with fresh streams of the other solvent.

Figure 2:
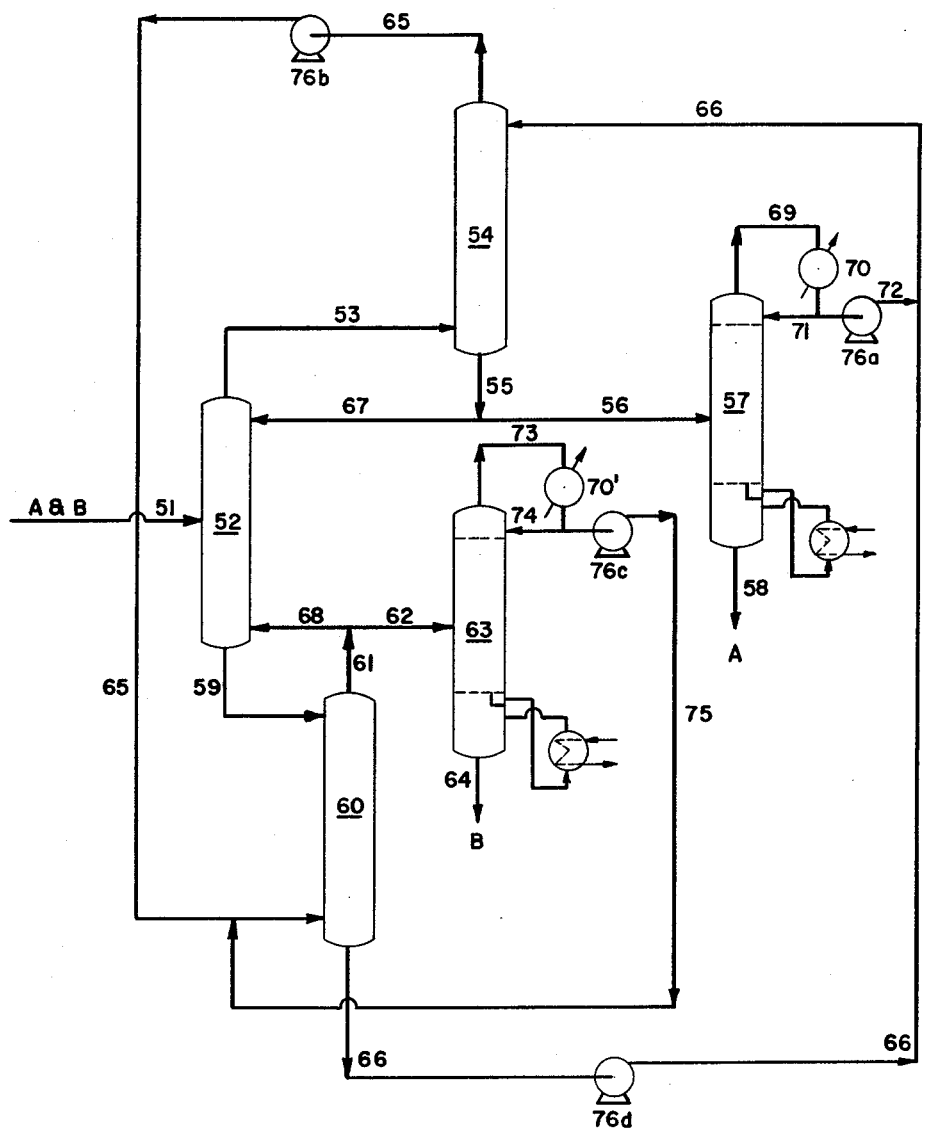

FIGURE 2 illustrates such an arrangement.

Referring to FIG. 2, a liquid mixture of two components A and B is fed into the center of fractional liquid extractor 52 by means of line 51. The feed introduced into principal extractor 52 is then subjected to the counter-current action of two immiscible solvents of different specific gravities, i.e. light solvent and heavy solvent.

The light solvent leaves the top of extractor 52 through line 53 to heavy solvent reflux extractor 54, with the component which is more soluble in it, in this illustration designated as component A. In extractor 54, component A is re-extracted with a volume of the heavy solvent, which is preferably greater than the minimum quantity required to substantially completely strip component A from the light solvent in the number of equilibrium stages provided in extractor 54. The excess volume of heavy solvent with component product A flows from extractor 54 by way of lines 55, 56 to heavy solvent recovery distillation column 57, for separation there of component A from the heavy solvent and its withdrawal through line 58.

The remaining portion of the heavy solvent and component A (reflux) flows through line 67 to extractor 52 where it comes into contact with feed mixture A and B, and light solvent. Ultimately the heavy solvent charged with component B leaves the bottom of extractor 52, through line 59 and passes directly to the light solvent reflux or secondary extractor 60. In extractor column 60, component B is extracted with a volume of the light solvent, which is preferably greater than the minimum quantity required to substantially completely remove component B from the heavy solvent in the number of equilibrium stages provided in extractor column 60. The excess light solvent and component B flow from extractor 60 by way of lines 61 and 62 to light solvent distillation column 63 for separation of component B from the light solvent and its withdrawal through line 64.

The remaining portion of the light solvent and component B (reflux) flows through line 68 to extractor 52.

The heavy solvent overhead from distillation column 57 passes through line 69 then condenser 70, the reflux returning to distillation column 57 by way of line 71 and the balance of the recovered heavy solvent is recycled through lines 72 and 66 to the top of secondary extractor 54. A pump 76a may be inserted in the recycle line if necessary. Stripped heavy solvent is also recycled from secondary extractor 60 through line 66 to secondary extractor 54 with a pump 76d conveniently located in line 66.

The light solvent overhead from distillation column 63 passes through line 73, then condenser 70′, the reflux returning to distillation column 63 by way of line 74 and the balance of the recovered light solvent is recycled through line 75 to secondary extractor 60. A pump 76c may be located in line 75 if necessary. The stripped light solvent is also recycled from secondary extractor 54 through line 65 to secondary extractor 60 with a pump 76b conveniently located in this line.

If the solvents employed are less volatile than the component products A and B, then the recycled solvents will be taken from the bottoms of the distillation columns, the process otherwise remaining the same.

This process has essentially the same economic advantages as those of the process in FIG. 1, whereby the benefits derived from using this process become proportionately greater, the more difficult the separation and the more expensive it is to carry out the fractional liquid extraction according to present practice.

The process illustrated by FIG. 2 may be applied to the purification of essential oils particularly the peppermint and spearmint oils and the citrus oil. The basic separation required in this purification is the removal of terpenes from the oxygenated flavoring compounds. Acetonitrile and hexane are suitable respectively for the heavy and light solvents in this process since the terpenes are more soluble in the hexane phase and the oxygenated compounds are more soluble in the acetonitrile phase.

The crude essential oil is introduced into the center of the fractional liquid extraction column 52 where the immiscible solvents are flowing counter-currently. The terpenes are removed in the hexane phase from the top of the column and this stream is run to heavy solvent reflux or secondary extractor 54 where the dissolved terpenes are stripped by extracting with a large volume of acetonitrile. Part of this acetonitrile extract is run to heavy solvent distillation column 57 where the acetonitrile is distilled off for recycle to heavy solvent secondary extractor 54 and the terpenes are removed as a residue. The remaining acetonitrile solution of terpenes leaving secondary extractor 54 constitutes the total acetonitrile feed to fractional liquid extraction column 52.

The heavy solvent (acetonitrile) stream from the bottom of fractional extraction column 52 which contains the oxygenated components in the feed is run to the light solvent reflux or secondary extractor 60 where these components are stripped by extraction with a large volume of hexane. Part of the hexane solution from this extractor 60 is passed to light solvent distillation column 63 where the hexane is recovered for recycle by way of line 75 to light solvent reflux extractor 60. The oxygenated compounds are recovered as a bottoms residue, free of terpenes. The remaining hexane solution from the light solvent secondary extractor 60 constitutes the total hexane feed to fractional liquid extractor 52.

The stripped acetonitrile from the bottom of light solvent reflux extractor 60 is combined in line 66 with the acetonitrile from terpene distillation column 57 to form the acetonitrile feed to heavy solvent secondary extractor 54. Similarly the stripper hexane from the top of this secondary extractor 54 combines with the hexane from the oxygenated compound distillation column 63 to constitute the hexane feed for the light solvent secondary extractor 60.

Figure 3:
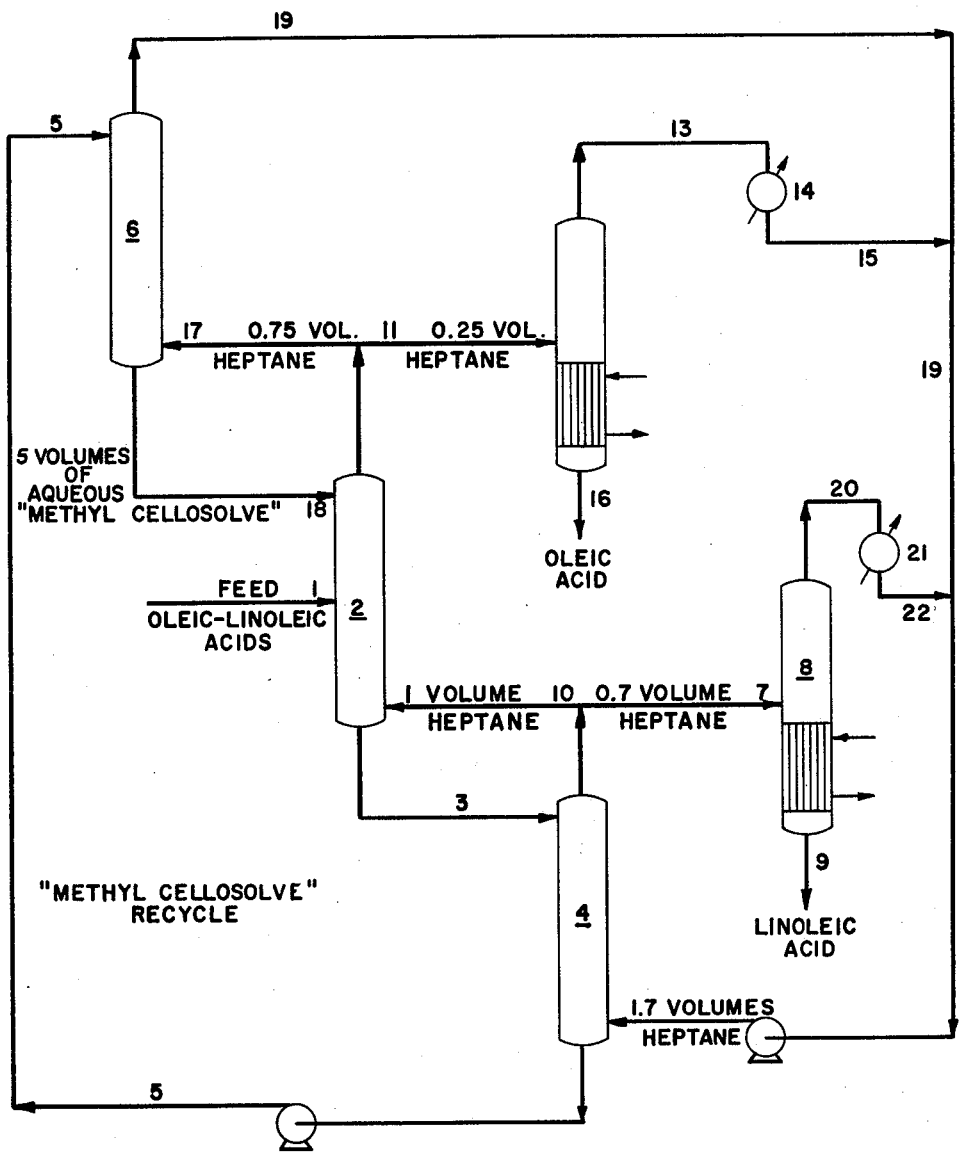
FIG. 3 illustrates an embodiment wherein one of the solvents is recycled internally of the extraction sequence through employment of the secondary extraction steps.

The basic concepts illustrated in the modes of FIGS. 1 and 2 can be employed in a system wherein one of the solvents is cascaded, so to speak, through the system and is never subjected to distillation. This feature can be an extremely advantageous arrangement when it is desired to use a mixed solvent as for example methyl Cellosolve and water as one of the dual solvents, e.g. the heavy solvent in the principal extraction. According to this particular mode one portion of the light solvent ultimately contains the component B and a separate portion of the light solvent contains the component A. These solvent portions can be distilled separated to recover the component products. FIGURE 3 illustrates such a system and, by way of a specific example, shows the separation of a feed mixture of oleic and linoleic acids. These mixed acids are isolated from tall oil, soyabean oil, cottonseed oil, castor oil, linseed oil, and other vegetable oils. Their separation into the individual acids is difficult and expensive by other known techniques, but can be accomplished economically by fractional liquid extraction with reflux according to the mode of FIG. 3. The separation is effected with a total steam requirement of about 2 pounds per pound of fatty acid feed, and represents an appreciable saving over a similar extraction operated without reflux (an extraction which requires about twice as much process steam per pound of feed).

In order to separate the oleic and linoleic acids by fractional liquid extraction, a solvent ratio of about five volumes of methyl Cellosolve (ethylene glycol monomethyl ether) containing 15% of water by volume is employed per volume of heptane in the fractional liquid-liquid extractor 2. The feed mixture is introduced through line 1 to fractional liquid extractor 2. The linoleic acid dissolved in the methyl Cellosolve product steam passes through line 3 from the bottom of fractional extractor 2, to light solvent reflux or secondary extractor 4 where it is extracted counter-currently with 1.7 volumes of heptane to strip the linoleic acid completely. The denuded methyl Cellosolve stream is recycled through line 5 to the oleic acid reflux or secondary extractor 6. The linoleic acid-rich heptane extract is split, 0.7 volume of the heptane is diverted through line 7 to an evaporator 8 where the heptane is removed through line 20, condenser 21 and line 22, leaving behind in evaporator 8 a linoleic acid bottoms product which is taken off by line 9.

The very low volatility of the linoleic acid relative to the heptane eliminates the need for fractional distillation in this separation.

The remaining 1.0 volume of heptane solution passes through line 10 to a fractional liquid extractor 2, producing a reflux ratio of 1.4 at the bottom of this column. The heptane solution passes through the extractor countercurrent to the 5.0 volumes of methyl Cellosolve, ultimately leaving the top of the column rich in oleic acid. One-quarter of the stream is diverted in line 11 to evaporator 12, where the heptane is distilled off through line 13, condenser 14 and line 15, while the oleic acid residue is recovered in line 16. The remaining three-quarters of the heptane solution of oleic acid passes through line 17 to the heavy solvent reflux extractor 6, where the oleic acid is stripped by counter-current extraction with the recycled 5.0 volumes of methyl Cellosolve solution entering the top through line 5. The oleic acid-rich reflux passes from the bottom of this extractor through line 18 to fractional liquid extractor 2, providing a 1:1 reflux ratio at the top. The oleic-acid free heptane raffinate leaving reflux extractor 6 by way of line 19 is combined with the distillate from both evaporators, and is recycled to the light solvent reflux extractor 4.

This flow system eliminates the need to evaporate large volumes of the methyl Cellosolve solution, a material which has a high boiling point and large latent heat. Advantageously also this system requires the evaporation of a minimum volume of the heptane solution. This system can be applied to the fractional liquid extraction of fatty acids with furfural, aniline and any other known solvents, and can be applied to the separation of any other mixtures which lend themselves to fractional liquid extraction. In the converse case, when it is the heavy solvent which requires the smaller latent heat for evaporation, the cascade process shown in FIG. 3 can be inverted so that a portion of the heavy phase from the extractor 6 will be run to the product recovery process and the balance of the heavy phase run to the fractional liquid extractor. The heavy phase from this extractor will be divided, part passing to the reflux extractor and the balance passing to the product recovery process. The light solvent flows continuously through the cascade system of extractors and all the recovered heavy solvent recycles to the top of the first extractor. Still other adaptations of this process may be apparent to those skilled in the art.

Figure 4:
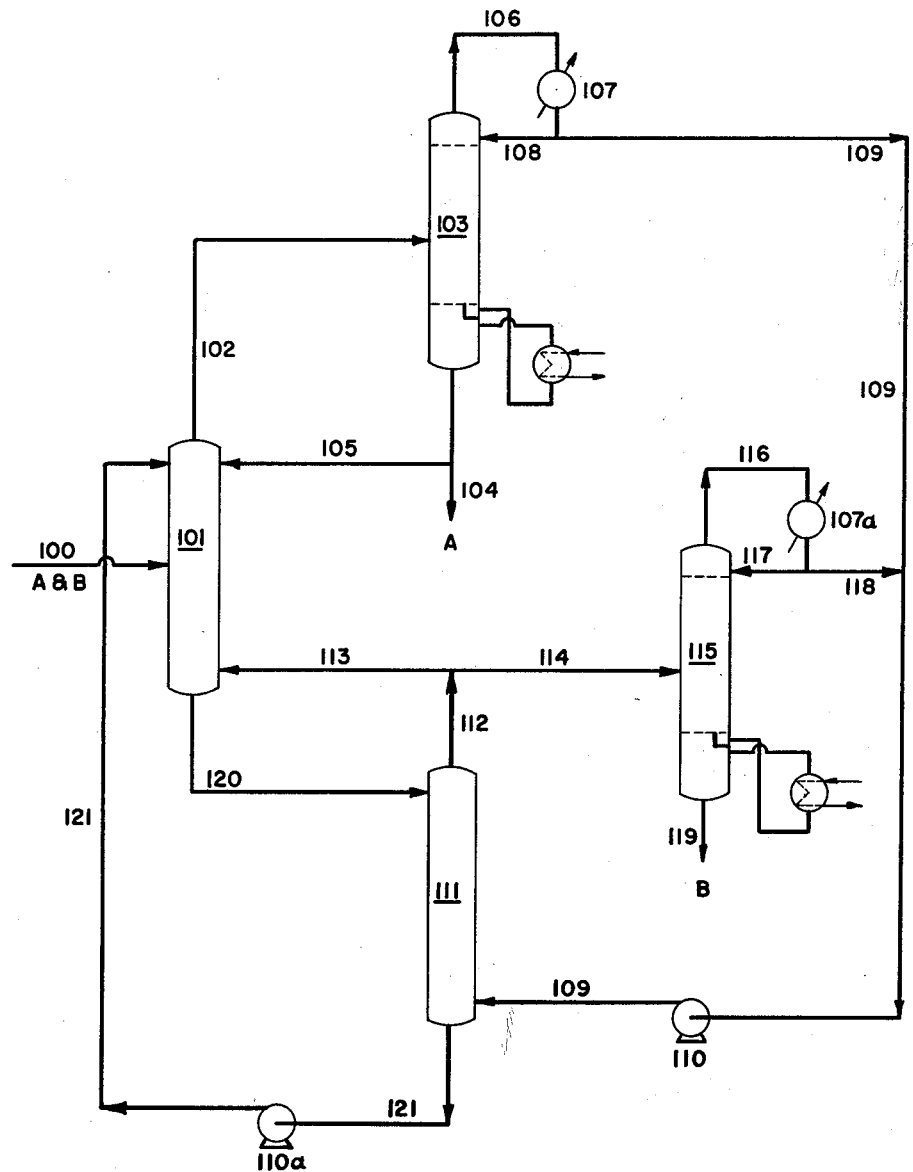
FIG. 4 illustrates another embodiment wherein both portions of the feed mixture are ultimately taken up into separate portions of one of the two solvents, for ultimate distillation recovery of products.

As shown in the arrangement of FIG. 4 it is also possible to provide other cascade arrangements wherein one of the solvents need never undergo distillation. This figure also illustrates that, where possible, advantage could be taken of any possibility for direct recovery of product from one of the streams leaving the principal dual solvent extractor.

In detail the process of FIG. 4 is carried out in the following manner.

The feed is introduced through line 100 into the center of fractional liquid extractor 101, and is there subjected to the counter-current action of two immiscible solvents of different specific gravities. The light solvent leaves the top of extractor 101 through line 102 into solvent distillation column 103 carrying the component product A with it. In distillation column 103, the light solvent is fractionally distilled to separate all of component product A. An appropriate amount of the separated product is refluxed to the top of extractor 101 by way of line 105. The balance of product A is withdrawn through line 104. The light solvent leaves distillation column 103 through line 106, and after passing through condenser 107 is divided, and possibly also a portion being refluxed through line 108 to distillation column 103, the rest is recycled through line 109 to a secondary extractor 111. A pump 110 may be located in line 109 if necessary.

The heavy solvent extract phase (with component B), leaves extractor 101 through line 120 and passes into extractor 111. From secondary extractor 111, the light solvent introduced from line 109 leaves through line 112. One portion of the light solvent with component B therein is passed to the bottom of extractor 101 through line 103. The balance flows through line 114 to solvent distillation column 115. Component B is withdrawn as the bottom product of distillation column 115 through line 119. The light solvent leaves overhead through line 116 and after passing through condenser 107a is divided, part being refluxed to distillation column 115 through line 117, while the balance is recycled through lines 118 and 109 to secondary extractor 111. From the bottom of extractor 111 the stripped heavy solvent is recycled through line 121 by a pump 110a conveniently located in this line.

If the converse of the condition indicated by the flow shown in FIG. 2 is found to exist, that is, if the heat required to evaporate the heavy solvent is less than the heat required to separate the light solvent from the products then the reflux extractor is employed on the light solvent and a fractional distillation column is used to separate the total heavy solvent extract phase into the component B and heavy solvent. The product stream therefrom is divided to provide both the desired reflux to the extractor and the end product B.

The flow diagram of FIG. 4 like the system of FIG. 3 is desirable for instances in which the latent heat of the heavy solvent is excessive, where the heavy solvent is high boiling or substantially non-volatile, and wherever the heavy solvent consists of a mixture of components of different volatilities, where accurate readjustment of the composition would be required when the mixed solvent is to be recycled.

An example of such separation is the liquid extraction of mixed fatty acids.

Oleic and linoleic acid can also be fractionated by the process shown in FIG. 4 using a heavy solvent consisting of 10% water and 90% methyl Cellosolve by volume and a light solvent of normal heptane at a solvent ratio of 2.1 volumes of heavy solvent per volume of heptane.

A seven stage fractional liquid extraction of a mixture of these acids was established in funnels using feeds of 625 ml. of heavy solvent to 250 ml. of heptane in countercurrent flow and introducing 25 ml. of an acid mixture containing 44% linoleic acid and 56% oleic acid into the center stage of the fractional liquid extraction operation without reflux at either end. As steady state was approached the heptane product solution contained 11.5 gms. of total acid of which 26% by weight was linoleic acid and the methyl Cellosolve product solution contained 8.7 gms. of total acid of which 65% by weight was linoleic acid.

On the basis of the data 20 stages are required in the fractional liquid extraction operation to give 90% pure products without reflux at a solvent ratio of 2.1 volumes of heavy solvent per volume of light solvent but with reflux such as shown in FIG. 4 the product purities would be better than 95% at the same solvent ratio.

Still another example is in the fractionation of tall oil.

Tall oil consists of a mixture of fatty acids and rosin acids primarily abietic, contaminated with some tar and appreciable amounts of unsaponifiable constituents such as the higher molecular weight alcohols. The vacuum distillation of this mixture into fatty acids and rosin acids is difficult and yields impure mixtures. In addition the high temperature encountered, even in vacuum distillation, causes the alcohols to esterify with the acids to produce more complex mixtures.

Steps similar to those taken in the fatty acid separation were applied to tall oil refining. A seven stage fractional liquid extraction pattern was developed using 650 ml. of a methyl Cellosolve containing 15 volume percent water and 250 ml. of normal heptane and introducing 40 ml. of crude tall oil into the center stage. The tall oil feed had a rosin acid number of 71.7 indicating an abietic acid equivalent concentration of 38.6%. As the concentration in the stages approached steady state the rosin acid number of the product in the methyl Cellosolve solution was 135 indicating an abietic acid concentration of 72.5% while the product in the heptane solution had a rosin acid number of 50.4 indicating 27.1% abietic acid. Advantageously the tars appeared to go preferentially into the methyl Cellosolve phase and the unsaponifiables passed out in the heptane phase. Therefore, both products were contaminated with impurities and the fatty acid rosin acid separation was appreciably better than apparent from the rosin acid number. This was confirmed by obtaining rosin acid numbers for the intermediate stages and a maximum of 150 was obtained in one phase indicating a purity of 80.6% abietic acid.

An interpretation of the additional intermediate stage data indicated a solvent ratio of 3.67 parts of methyl Cellosolve was required per unit volume of heptane and that the process as a whole would be similar to that shown in FIGURE 3. A solvent rate of 3.67 volumes of the methyl Cellosolve solution used in place of the 6 volumes shown and the heptane rate to the bottom of the extractor 4 increased to 1.83 volumes with 0.83 volume diverted to evaporator 8 to give a reflux ratio of 1.2 at the bottom of the extractor.

In order to reduce the solvent ratio, if desired, it is possible to employ a methyl Cellosolve solvent consisting of 10% water by volume rather than the 15% composition. With 10% water in the methyl Cellosolve a solvent ratio of 1.4 volumes per volume of heptane was required in the extractor 2. The heptane rate to the bottom of extractor 4 was 1.5 of which 0.5 volume was diverted to the evaporator 8 to give a reflux ratio of 2.0 at the bottom of extractor 2.

Figure 5:
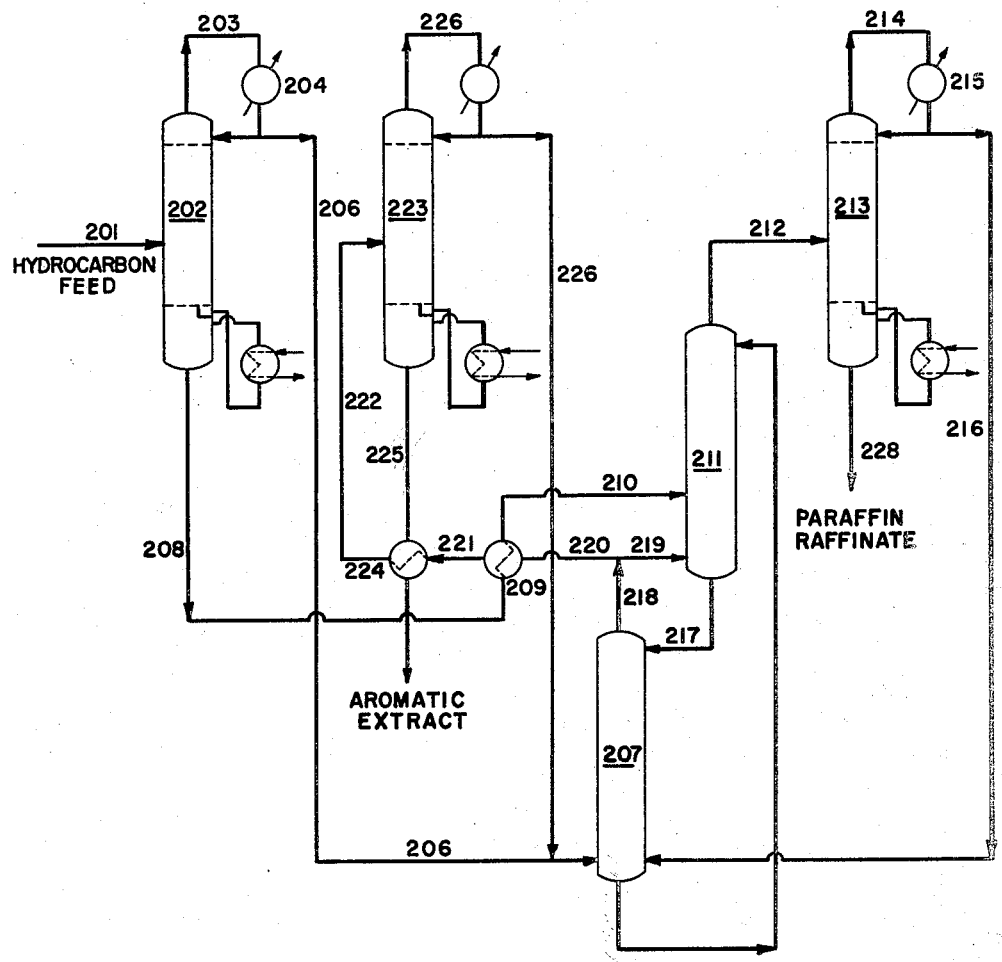
FIG. 5 illustrates an embodiment wherein one of the two solvents is obtained directly from the material being treated.

FIG. 5 illustrates how the dual solvent and reflux principles previously explained and disclosed can be integrated into situations not normally considered a dual solvent system, namely, to the solvent refining of gasoline or other petroleum fractions. Essentially, the mode of FIG. 5 involves prefractionating hydrocarbon feed stock to separate out the paraffinic light ends of the hydrocarbon stream for use as one of the two immiscible solvents. A debutanized gasoline fraction from a hydroformer, for example, is prefractionated to remove the volatile constituents. If the feed contains only small amounts of normal heptane this fraction may cover the $C_5$ to 220° boiling range. If the feed contains appreciable quantities of normal heptane (which has 0 octane number), the volatilized fraction should cover only the $C_5$–185° F. boiling point range which will include the benzene present in the feed stock.

Other than the prefractionation feature the process arrangement of FIG. 5 is very much like that of FIG. 4.

Referring now to FIG. 5, it can be seen that the feed stock is introduced through line 201 to prefractionator 202. The overhead product from the prefractionator passes through line 203, condenser 204 and line 206 to solvent stripper 207. The bottoms product of prefractionator 202 is run, by way of line 208, heat exchanger 209, and line 210, to fractional liquid extractor 211. In extractor 211 the principal extraction takes place, the prefractionator bottoms being there subjected to countercurrent flow of the light hydrocarbons and solvent. The light phase or raffinate leaving the top of extractor 211 runs through line 212 to raffinate still 213 where the light hydrocarbons solvent is removed as overhead via line 214, condenser 215 and line 216. The higher boiling raffinate bottoms product consist of the paraffinic components in the original feed stock. They are withdrawn from the bottom of the column by way of line 228 and normally would be returned to the reformer.

The solvent extract from the bottom of fractional liquid extractor 211 runs via line 217 to solvent stripper 207 (which constitutes a secondary extraction column) where the aromatic hydrocarbons are removed by counter-current contact with the light low boiling hydrocarbon entering from line 206. Part of the light hydrocarbon solvent phase is run by lines 218 and 219, to the principal extractor 211 thereby returning reflux to the principal extractor. The balance of the light hydrocarbon solvent phase through lines 220, 221 and 222 and heat exchangers 209 and 224 to extract still 223, where the light hydrocarbon solvent is distilled off as the overhead and the aromatic extract is withdrawn through 225 as the bottoms product of the column 223. The light hydrocarbon distillate from the extract still 223 leaving overhead through line 226, is combined in line 206 with the overhead from the prefractionator and together with the light hydrocarbon distillate in line 216 coming from the raffinate still 213 provides the light phase solvent feed to solvent stripper 207.

The aromatic column 223 is built with less plates and operated at a lower reflux ratio than prefractionator 202 in order to provide a "sloppy" separation which leaves in the bottoms product an amount of the light, low boiling hydrocarbons equal to the quantity of light hydrocarbons taken overhead in the prefractionator.

The mode of FIG. 5 is a modification of the FIG. 4 arrangement particularly adapted to the separation of aromatic and paraffinic constituents in hydrocarbon mixture of the gasoline boiling point range. This separation is desirable because the aromatic constituents in a gasoline fraction contribute high octane numbers while the straight paraffinic constituents greatly reduce octane numbers. The separation of paraffinic constituents is extremely desirable because they can be recycled to a catalytic hydroformer and converted to additional aromatic constituents.

Specifically there are different methods for controlling a hydroforming operation. In the case of "high severity" reforming conditions the reactor effluent is very highly aromatic and possesses a high octane number. With "mild severity" reforming conditions the reactor effluent contains an appreciable amount of paraffinic, low-octane constituents. In the first case, catalyst life is considerably shorter than in the latter case and the catalyst life represents a significant factor in the operating costs of a hydroformer. In order to reduce this cost the effluent from a mild severity operation has been subjected to separation processes to obtain an aromatic, high octane number fraction and a paraffinic, low octane number fraction for recycle. The mode of FIG. 5 constitutes such a separation process.

The heavy solvent cascaded through the system without being subjected to distillation is preferably a low boiling alcohol admixed with minor amounts of water. Actually the process description given above is based on the use of a solvent consisting of 5 volumes of water and 95 volumes of methanol, a ratio of 4 parts heavy solvent per part of light solvent is employed in extractor 211. Ethyl alcohol containing a greater concentration of water than 5%, or isopropyl alcohol containing more water than ethyl alcohol could be employed in this procedure. Methanol is preferred, largely because it is the least expensive alcohol.

An important feature of the hydrocarbon separation process is the extraction of the aromatic hydrocarbons from the solvent with a low boiling hydrocarbon which can be readily separated from the aromatic hydrocarbons in the feed. This solvent would be in the butane-pentane-hexane range and in the above given process description the entire light end fraction of the reformate product is used. This solvent fraction contains the benzene and heptane as well as lower boiling hydrocarbons. Importantly, at least from an equipment cost viewpoint, the fractionation in the extract distillation column can be very incomplete since the extract product from the bottom of this column includes the exact amount of this light end fraction in the original feed; only the excess light ends is distilled off and recycled to the extraction sequence.

This separation process is in contrast to the production of pure aromatics in which a lower boiling hydrocarbon would be used in the secondary extraction as the solvent stripper. Then: hexane or lower boiling hydrocarbons would be used if the lowest boiling aromatic in the feed to the extractor was toluene; pentane or a still lower boiling hydrocarbon would be required if the lowest boiling aromatic were benzene. With this modification the process of FIG. 5 could be used to prepare a pure aromatic fraction from which the individual components could be readily separated by fractional distillation in column 223.

It should be noted in the FIG. 5 procedure that complete removal of solvent from the hydrocarbon streams is effected in the distillation columns because the dissolved methanol and the trace of dissolved water form an azeotrope with the light hydrocarbon and are taken overhead. Complete removal of solvent from hydrocarbon streams constitutes a difficult and expensive operation when a high boiling solvent is used for the solvent refining of reformate. Removal of solvent from the raffinate is particularly essential to avoid contamination of the catalyst by its presence in the recycle paraffin stream. In the aromatic extract, the solvent may contribute undesirable properties to the final gasoline besides constituting a solvent loss, but in this instance of methanol its presence in the aromatic stream would not be particularly objectionable. In any event the tendency would be for substantially all of the methanol to pass overhead from the extract still.

What is claimed is:

1. A process for separating a mixture of two components having different distribution coefficients between an immiscible pair of solvents of different specific gravities which comprises: (1) introducing the mixture into an intermediate stage of a multistage counter-current primary extractor in which the light solvent is introduced into the bottom end and the heavy solvent is introduced into the top end, the ratio between these solvents being such that the extraction factor for one component will be greater than unity and the extraction factor for the other component will be less than unity; (2) contacting part of the enriched heavy solvent from the primary extractor in a second multistage extractor with fresh light solvent so that the extraction factor for the component in the heavy solvent will be great than unity; (3) separating the dissolved component from the other part of the enriched heavy solvent from the primary extractor; (4) recycling the heavy solvent recovered from steps (2) and (3) to a third extractor; (5) contacting part of the enriched light solvent from the primary extractor with this heavy solvent in the third extractor so the extraction factor for the component in the light solvent will be less than unity; (6) separating the dissolved component from the other part of the enriched light solvent from the primary extractor; (7) recycling the now fresh light solvent recovered from steps (5) and (6) to the second extractor.

2. A process for separating a mixture of two components having different distribution coefficients between an immiscible pair of solvents of different specific gravities which comprises: (1) introducing the mixture into an intermediate stage of a multistage counter-current primary extractor in which the light solvent is introduced into the bottom end and the heavy solvent is introduced into the top end, the ratio between these solvents being such that the extraction factor for one component will be greater than unity and the extraction factor for the other component will be less than unity; (2) contacting the enriched heavy solvent from the primary extractor in a second multistage extractor with fresh light solvent so the extraction factor for the component in the heavy solvent will be greater than unity; (3) recycling part of the light solvent stream to the primary extractor and separating the dissolved component from the balance of such stream; (4) recycling the separated now fresh light solvent to the second extractor; (5) recycling the heavy solvent recovered from step (2) to a third extractor; (6) contacting part of the enriched light solvent from the primary extractor with this heavy solvent in the third extractor so the extraction factor for the component in the light solvent will be less than unity; (7) separating the dissolved component from the other part of the enriched light solvent from the primary extractor; (8) recycling the now fresh light solvent recovered from steps (6) and (7) to the second extractor.

3. A process for separating a mixture of two components having different distribution coefficients between an immiscible pair of solvents of different specific gravities which comprises: (1) introducing the mixture into an intermediate stage of a multistage counter-current primary extractor in which the light solvent is introduced into the bottom end and the heavy solvent is introduced into the top end, the ratio between these solvents being such that the extraction factor for one component will be greater than unity and the extraction factor for the other component will be less than unity; (2) contacting the enriched light solvent from the primary extractor in a second multistage extractor with fresh heavy solvent so the extraction factor for the component in the heavy solvent will be less than unity; (3) recycling part of the heavy solvent stream to the primary extractor and separating the dissolved component from the balance of such stream; (4) recycling the separated now fresh heavy solvent to the second extractor; (5) recycling the light solvent recovered from step (2) to a third extractor; (6) contacting part of the enriched heavy solvent from the primary extractor with this light solvent in the third extractor so the extraction factor for the component in the heavy solvent will be greater than unity; (7) separating the dissolved component from the other part of the enriched heavy solvent from the primary extractor; (8) recycling the now fresh heavy solvent recovered from steps (6) and (7) to the second extractor.

4. A process for separating a mixture of oleic and linoleic acids between an immiscible pair of solvents of different specific gravity which comprises: (1) introducing the mixture into an intermediate stage of a multistage counter-current primary extractor in which heptane is introduced at the lower end and ethylene glycol monomethyl ether is introduced at the upper end, the ethylene glycol monomethyl ether being employed in quantities sharply in excess of the heptane whereby the mixture is separated, the linoleic acid becoming dissolved in the ethylene glycol monomethyl ether and the oleic acid becoming dissolved in the heptane; (2) contacting the linoleic acid enriched ethylene glycol monomethyl ether from the primary extractor in a second multistage extractor with fresh heptane to re-extract the linoleic acid therefrom; (3) passing part of the linoleic acid enriched heptane from the second extractor to the primary extractor as the heptane feed thereto and separating the balance of the heptane to recover therefrom linoleic acid and fresh heptane; (4) recycling the fresh heptane from the linoleic acid separation to the second extractor; (5) passing the extracted ethylene glycol monomethyl ether from the second extractor to a third extractor; (6) in the third extractor, contacting part of the oleic acid enriched heptane from the primary extractor with this ethylene glycol monomethyl ether to remove therefrom the oleic acid content; (7) separating the balance of the heptane leaving the primary extractor to recover therefrom the oleic acid and fresh heptane; and (8) recycling the heptane recovered in steps (6) and (7) to the second extractor.

5. A process for separating a mixture of two components having different distribution coefficients between an immiscible pair of solvents of different specific gravities which comprises: (1) introducing the mixture into an intermediate stage of a multistage counter-current primary extractor in which the light solvent is introduced into the bottom end and the heavy solvent is introduced into the top end, the ratio between these solvents being such that the extraction factor for one component will be greater than unity, and the extraction factor for the other component will be less than unity; (2) contacting part of the enriched heavy solvent from the primary extractor in a second multistage extractor with fresh light solvent so that the extraction factor for the component in the heavy solvent will be greater than unity; (3) separating the dissolved component from the other part of the enriched heavy solvent from the primary extractor; (4) recycling the heavy solvent recovered from steps (2) and (3) to a third extractor; (5) contacting part of the enriched light solvent from the primary extractor with this heavy solvent in the third extractor so the extraction factor for the component in the light solvent will be less than unity; (6) separating the dissolved component from the other part of the enriched light solvent from the primary extractor; (7) recycling the now fresh light solvent recovered from steps (5) and (6) to the second extractor; (8) passing heavy solvent enriched in the third extractor to the primary extractor as the heavy solvent feed thereto and (9) passing light solvent enriched in the second extractor to the primary extractor as the light solvent feed thereto.

6. A process for separating a mixture of two components having different distribution coefficients between an immiscible pair of solvents of different specific gravities which comprises: (1) introducing the mixture into an intermediate stage of a multistage counter-current extractor in which the light solvent is introduced into one end and the heavy solvent is introduced into the other, the ratio between these solvents being such that the extraction factor for one component will be greater than unity and the extraction factor for the other component will be less than unity; (2) contacting enriched heavy solvent from the primary extractor in a second multistage extractor with fresh light solvent so that the extraction factor for the component in the heavy solvent will be greater than unity; thereby providing in addition to the enriched heavy solvent stream leaving the primary extractor a light solvent stream enriched with the same component; (3) isolating the dissolved component from a portion of one of said above identified enriched solvent streams and recycling the recovered solvent in the process as a fresh solvent stream; (4) contacting enriched light solvent from the primary extractor in a third multistage extractor with fresh heavy solvent so that the extraction factor for the component in the light solvent will be less than unity, thereby providing in addition to the enriched light solvent leaving the primary extractor a heavy solvent stream enriched in the same component; (5) isolating the dissolved component from a portion of one of the last named enriched solvent streams and recycling the recovered solvent in the process as a fresh solvent stream; (6) recycling the now stripped heavy solvent from the second extractor and the now stripped light solvent from the third extractor as fresh solvents.

7. A process for separating a mixture of two components having different distribution coefficients between an immiscible pair of solvents of different specific gravities which comprises: (1) introducing the mixture into an intermediate stage of a multistage counter-current extractor in which the light solvent is introduced into one end and the heavy solvent is introduced into the other, the ratio between these solvents being such that the extraction factor for one component will be greater than unity and the extraction factor for the other component will be less than unity; (2) contacting enriched heavy solvent from the primary extractor in a second multistage extractor with fresh light solvent so that the extraction factor for the component in the heavy solvent will be greater than unity; thereby providing in addition to the enriched heavy solvent stream leaving the primary extractor a light solvent stream enriched with the same component; (3) isolating the dissolved component from a portion of one of said above identified enriched solvent streams and recycling the recovered solvent in the process as a fresh solvent stream; (4) contacting enriched light solvent from the primary extractor in a third multistage extractor with fresh heavy solvent so that the extraction factor for the component in the light solvent will be less than unity, thereby providing in addition to the enriched light solvent leaving the primary extractor a heavy solvent stream enriched in the same component; (5) isolating the dissolved component from a portion of one of the last named enriched solvent streams and recycling the recovered solvent in the process as a fresh solvent stream; (6) recycling the now stripped heavy solvent from the second extractor and the now stripped light solvent from the third extractor as fresh solvents; (7) passing enriched light solvent from the second extractor to the bottom of the primary extractor as the light solvent feed thereto and (8) passing enriched heavy solvent from the third extractor to the top of the primary extractor as the heavy solvent feed thereto.

8. A process for separating a mixture of two components having different distribution coefficients between an immiscible pair of solvents of different specific gravities which comprises: (1) introducing the mixture into an intermediate stage of a multistage counter-current extractor in which the light solvent is introduced into one end and the heavy solvent is introduced into the other, the ratio between these solvents being such that the extraction factor for one component will be greater than unity and the extraction factor for the other component will be less than unity, thereby producing a heavy solvent extract phase and a light solvent extract phase; (2) contacting at least a portion of one of said solvent extract phases in a second multistage extractor with a fresh stream of the other solvent to thereby transfer the extracted component to the other solvent; the operation of steps (1) and (2) providing for component recovery purposes both light and heavy solvent steams enriched with the same component; (3) distilling the dissolved component from a portion of one of said above identified enriched solvent streams and recycling recovered solvent as a fresh solvent stream; (4) employing at least a portion of the newly enriched solvent from step (2) as one of the solvents fed to the primary extractor; (5) suitably isolating the other component from the other extract phase and recycling the recovered solvent as a fresh solvent stream in the process.

9. A process for separating a mixture of two components having different distribution coefficients between an immiscible pair of solvents of different specific gravities which comprises: (1) introducing the mixture into an intermediate stage of a multistage counter-current extractor in which the light solvent is introduced into one end and the heavy solvent is introduced into the other, the ratio between these solvents being such that the extraction factor for one component will be greater than unity and the extraction factor for the other component will be less than unity; (2) contacting the enriched heavy solvent from the primary extractor in a second multistage extractor with fresh light solvent, so that the extraction factor for the component in the heavy solvent will be greater than unity; (3) dividing the light solvent stream from the second extractor to send the requisite quantity of light solvent to the primary extractor and diverting the excess quantity of this stream; (4) isolating the dissolved component from this excess light solvent stream; (5) contacting the enriched light solvent stream from the primary extractor in a third multistage counter-current extractor with heavy solvent, so the extraction factor for the dissolved component will be less than unity; (6) dividing the heavy solvent stream from this third extractor to send the proper amount to the primary extractor and diverting the excess quantity of this stream; (7) isolating the dissolved component from this excess heavy solvent stream; (8) combining the recovered solvent with the heavy solvent from the second extractor and recycling the total stream to the third extractor; (9) combining the recovered solvent from step (4) with the light solvent from the third extractor and recycling the total stream of now fresh light solvent to the second extractor.

10. A process for separating a mixture of two components having different distribution coefficients between an immiscible pair of solvents of different specific gravities, which comprises: (1) introducing the mixture into an intermediate stage of a multistage countercurrent extractor in which the light solvent is introduced into one end and the heavy solvent is introduced into the other, the ratio between these solvents being such that the extraction factor for one component will be greater than unity and the extraction factor for the other component will be less than unity; (2) contacting the heavy solvent in a second multistage contactor with a larger ratio of fresh light solvent, so that the extraction factor for the component in the heavy solvent will be greater than unity; (3) recycling the extracted heavy solvent from this second extractor to the primary extractor; (4) dividing the light solvent stream from the second extractor to send the requisite quantity of light solvent to the primary extractor, and diverting the excess quantity of this stream; (5) isolating the component dissolved in this stream; (6) isolating the component dissolved in the light solvent stream from the primary extractor; and (7) combining the recovered now fresh light solvent streams and recycling to the second extractor.

11. A process for separating a mixture of two components having different distribution coefficients between an immiscible pair of solvents of different specific gravities, which comprises: (1) introducing the mixture into an intermediate stage of a multistage counter-current extractor in which the light solvent is introduced into one end and the heavy solvent is introduced into the other, the ratio between these solvents being such that the extraction factor for one component will be greater than unity and the extraction factor for the other component will be less than unity; (2) contacting the heavy solvent in a second multistage contactor with a larger ratio of fresh light solvent, so that the extraction factor for the component in the heavy solvent will be greater than unity; (3) recycling the extracted heavy solvent from this second extractor to the primary extractor; (4) dividing the light solvent stream from the second extractor to send the requisite quantity of light solvent to the primary extractor, and diverting the excess quantity of this stream to a distillation column for removal of dissolved component and recovery of the light solvent; (5) passing the light solvent stream from the primary extractor to a distillation column for removal of the dissolved component and recovery of the light solvent; and (6) combining the recovered now fresh light solvent streams and recycling to the second extractor.

12. A process for separating a mixture of two components having different distribution coefficients between an immiscible pair of solvents of different specific gravities, which comprises: (1) introducing the mixture into an intermediate stage of a multistage counter-current extractor in which the light solvent is introduced into one end and the heavy solvent is introduced into the other, the ratio between these solvents being such that the extraction factor for one component will be greater than unity and the extraction factor for the other component will be less than unity; (2) contacting the light solvent in a second multistage contactor with a larger ratio of fresh heavy solvent, so that the extraction factor for the component in the light solvent will be less than unity; (3) recycling the extracted light solvent from this second extractor to the primary extractor; (4) dividing the heavy solvent stream from the second extractor to send the requisite quantity of heavy solvent to the primary extractor, and diverting the excess quantity of this stream; (5) isolating the component dissolved in this stream; (6) isolating the component dissolved in the heavy solvent stream from the primary extractor; and (7) combining the recovered now fresh heavy solvent streams and recycling to the second extractor.

13. A process for separating a mixture of two components having different distribution coefficients between an immiscible pair of solvents of different specific gravities, which comprises: (1) introducing the mixture into an intermediate stage of a multistage counter-current extractor in which the light solvent is introduced into one end and the heavy solvent is introduced into the other, the ratio between these solvents being such that the extraction factor for one component will be greater than unity and the extraction factor for the other component will be less than unity; (2) contacting the light solvent in a second multistage contactor with a larger ratio of fresh heavy solvent, so that the extraction factor for the component in the heavy solvent will be less than unity; (3) recycling the extracted light solvent from this second extractor to the primary extractor; (4) dividing the heavy solvent stream from the second extractor to send the requisite quantity of heavy solvent to the primary extractor, and diverting the excess quantity of this stream to a distillation column for removal of dissolved component and recovery of the heavy solvent; (5) passing the heavy solvent stream from the primary extractor to a distillation column for removal of the dissolved component and recovery of the heavy solvent; and (6) combining the recovered now fresh heavy solvent streams and recycling to the second extractor.

14. A process for separating terpenes and oxygenated compounds from a mixture thereof which comprises: (1) introducing the mixture into an intermediate stage of a multistage counter-current contactor in which hexane is introduced at the bottom, and acetonitrile is introduced at the top, the ratio between these solvents being such that the extraction factor for one component will be greater than unity and the extraction factor for the other component will be less than unity; (2) contacting the acetonitrile in a second multistage contactor with a larger ratio of fresh hexane so that the extraction factor for the oxygenated compounds in the acetonitrile will be greater than unity; (3) dividing the hexane stream from the second extractor to send the requisite quantity of hexane to the primary extractor and diverting the excess quantity of this stream for recovery of the dissolved terpenes; (4) contacting the hexane stream from the primary extractor in a third multistage counter-current extractor with a larger quantity of fresh acetonitrile so the extraction factor for the dissolved product will be less than unity; (5) dividing the acetonitrile stream from this third extractor to send the proper amount to the primary extractor; (6) isolating the dissolved oxygenated compounds from the excess acetonitrile stream; (7) combining recovered acetonitrile with the acetonitrile from the second extractor and recycling the total now fresh acetonitrile stream to the third extractor; (8) isolating the dissolved terpenes from the excess hexane from the second extractor; (9) combining recovered hexane with the hexane from the third extractor and recycling the total now fresh hexane stream to the second extractor.

15. A process for separating a mixture of oleic and linoleic acids from a mixture thereof which comprises: (1) introducing the mixture into an intermediate stage of a multistage counter-current extractor in which hexane is introduced into one end and a 10% water-90% ethylene glycol monomethyl ether mixture is introduced into the other, the ratio between these solvents being such that the extraction factor for one acid will be greater than unity and the extraction factor for the other acid will be less than unity; (2) contacting the water ethylene glycol monomethyl ether fraction in a second multistage contactor with a larger ratio of fresh hexane so that the extraction factor for the linoleic acid in this water-ethylene glycol monomethyl ether mixture will be greater than unity; (3) recycling the extracted water-ethylene glycol monomethyl ether mixture from the second extractor to the primary extractor; (4) dividing the hexane stream from the second extractor to send the requisite quantity of hexane to the primary extractor and diverting the excess quantity of this stream to a distillation column for removal of linoleic acid and recovery of the hexane; (5) passing the hexane solvent stream from the primary extractor to a distillation column for removal of the dissolved oleic acid and recovery of hexane; and (6) combining the recovered now fresh hexane streams and recycling same to the second extractor.

16. A process for separating tall oil into its constituent resin and fatty acids which comprises: (1) introducing the tall oil into an intermediate stage of a multistage counter-current extractor in which hexane is introduced into one end and ethylene glycol monomethyl ether containing up to about 10% water is introduced into the other end, the ratio between these solvents being such that the extraction factor for one component is greater than unity and the extraction factor for the other component will be less than unity; (2) contacting the ethylene glycol monomethyl ether stream in a second multistage contactor with a larger ratio of fresh hexane so that the extraction factor for the rosin acid in the ethylene glycol monomethyl ether will be greater than unity; (3) recycling the extracted ethylene glycol monomethyl ether from the second extractor to the primary extractor; (4) dividing the hexane stream from the second extractor to send a requisite quantity to the primary extractor and diverting the excess quantity of this stream to a distillation column for removal of dissolved rosin acid and recovery of the hexane; (5) passing the hexane stream from the primary extractor to a distillation column for removal of the dissolved fatty acid and recovery of the hexane; and (6) combining the recovered now fresh hexane streams and recycling same to the second extractor.

References Cited in the file of this patent

UNITED STATES PATENTS

| | | |
|---|---|---|
| 2,278,309 | Freeman | Mar. 31, 1942 |
| 2,354,812 | Jenkins | Aug. 1, 1944 |
| 2,363,925 | Adams | Nov. 28, 1944 |
| 2,423,232 | Freeman et al. | July 1, 1947 |
| 2,676,903 | Scheibel et al. | Apr. 27, 1954 |
| 2,727,848 | Georgian | Dec. 20, 1955 |
| 2,799,627 | Haensel | July 16, 1957 |

FOREIGN PATENTS

| | | |
|---|---|---|
| 1,068,677 | France | June 30, 1954 |